US012683321B2

United States Patent

(12) United States Patent
Nishi et al.

(10) Patent No.: US 12,683,321 B2
(45) Date of Patent: Jul. 14, 2026

(54) SEALING MEMBER, WIRE HARNESS PROVIDED WITH SEALING MEMBER, CONNECTOR PROVIDED WITH SEALING MEMBER

(71) Applicant: Yazaki Corporation, Tokyo (JP)

(72) Inventors: Ryosuke Nishi, Shizuoka (JP); Masafumi Nakayasu, Shizuoka (JP); Hiroki Gotou, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 283 days.

(21) Appl. No.: 18/510,027

(22) Filed: Nov. 15, 2023

(65) Prior Publication Data

US 2024/0154354 A1 May 9, 2024

(30) Foreign Application Priority Data

Nov. 18, 2022 (JP) ................................ 2022-184840

(51) Int. Cl.
*H01R 13/52* (2006.01)

(52) U.S. Cl.
CPC .................................. *H01R 13/52* (2013.01)

(58) Field of Classification Search
CPC . H01R 13/52; H01R 13/5219; H01R 13/5216
See application file for complete search history.

(56) References Cited

U.S. PATENT DOCUMENTS

| | | | |
|---|---|---|---|
| 9,989,578 B2 | 6/2018 | Ghannam et al. | |
| 2018/0115104 A1* | 4/2018 | Suzuki ............... | H01R 13/5219 |
| 2022/0136606 A1 | 5/2022 | Morello et al. | |

FOREIGN PATENT DOCUMENTS

| | | | |
|---|---|---|---|
| JP | 02-000470 U | 1/1990 | |
| JP | 2010 211933 A | 9/2010 | |
| JP | 2016-213053 A | 12/2016 | |
| JP | 2020068187 A * | 4/2020 | ............ H01R 43/20 |
| JP | 7107812 B2 | 7/2022 | |

OTHER PUBLICATIONS

English Translation of JP 2020-68187 A. (Year: 2020).*

* cited by examiner

*Primary Examiner* — Sean Gugger
(74) *Attorney, Agent, or Firm* — Sughrue Mion, PLLC

(57) ABSTRACT

A sealing member includes at least one sealing material made from an elastic material, and a high rigidity material provided as a single body with the at least one sealing material and having a rigidity higher than a rigidity of the at least one sealing material.

7 Claims, 4 Drawing Sheets

SEALING MEMBER, WIRE HARNESS PROVIDED WITH SEALING MEMBER, CONNECTOR PROVIDED WITH SEALING MEMBER

CROSS-REFERENCE TO RELATED APPLICATIONS

The present application is based on and claims the benefit of priority from the prior Japanese Patent Application No. 2022-184840, filed on Nov. 18, 2022, the entire contents of which are incorporated by reference herein.

TECHNICAL FIELD

The disclosure relates to a sealing member, a wire harness provided with the sealing member, and a connector provided with the sealing member.

BACKGROUND

JP2010-211933 A (Patent Literature 1) discloses packing arranged between a housing and an adherend, as a sealing member. The outer peripheral surface of the packing comes into close adhesion with the housing and the adherend to realize sealing between the housing and the adherend. By realizing sealing between the housing and the adherend using the packing, it is possible to prevent water, oil, or the like from entering the inside of the housing and the inside of the adherend.

SUMMARY

The sealing member as described in Patent Literature 1 is formed of a single sealing material, for example, an elastic material such as rubber. The sealing member formed of a single sealing material has a high level of close adhesion to a mating member to which it adheres closely and has excellent sealing properties, but has low rigidity and easily deforms. Thus, for example, when a member interfering with the sealing member was arranged at the part where the sealing member was arranged, there was a possibility of the sealing member deforming and a gap being formed between the sealing member and the mating member, resulting in reduced sealing properties.

The disclosure is made in view of the above issue in the related art. An object of the disclosure is to provide a sealing member capable of stabilizing the sealing properties, a wire harness provided with the sealing member, and a connector provided with the sealing member.

A sealing member in accordance with a first aspect includes: at least one sealing material made from an elastic material; and a high rigidity material provided as a single body with the at least one sealing material and having a rigidity higher than a rigidity of the at least one sealing material.

A wire harness in accordance with a second aspect includes: an electric wire; a housing arranged at an end part of the electric wire; and a sealing member arranged on a fitting surface of the housing, wherein the sealing member includes: at least one sealing material made from an elastic material; and a high rigidity material provided as a single body with the at least one sealing material and having a rigidity higher than a rigidity of the at least one sealing material.

A connector in accordance with a third aspect includes: a housing; a mating housing that can be fitted to the housing; and a sealing member arranged between the housing and the mating housing and adhered closely to the housing and the mating housing, wherein the sealing member includes: at least one sealing material made from an elastic material; and a high rigidity material provided as a single body with the at least one sealing material and having a rigidity higher than a rigidity of the at least one sealing material.

According to the disclosure, a sealing member capable of stabilizing sealing properties, a wire harness provided with the sealing member, and a connector provided with the sealing member are provided.

DETAILED DESCRIPTION

Figure 1:
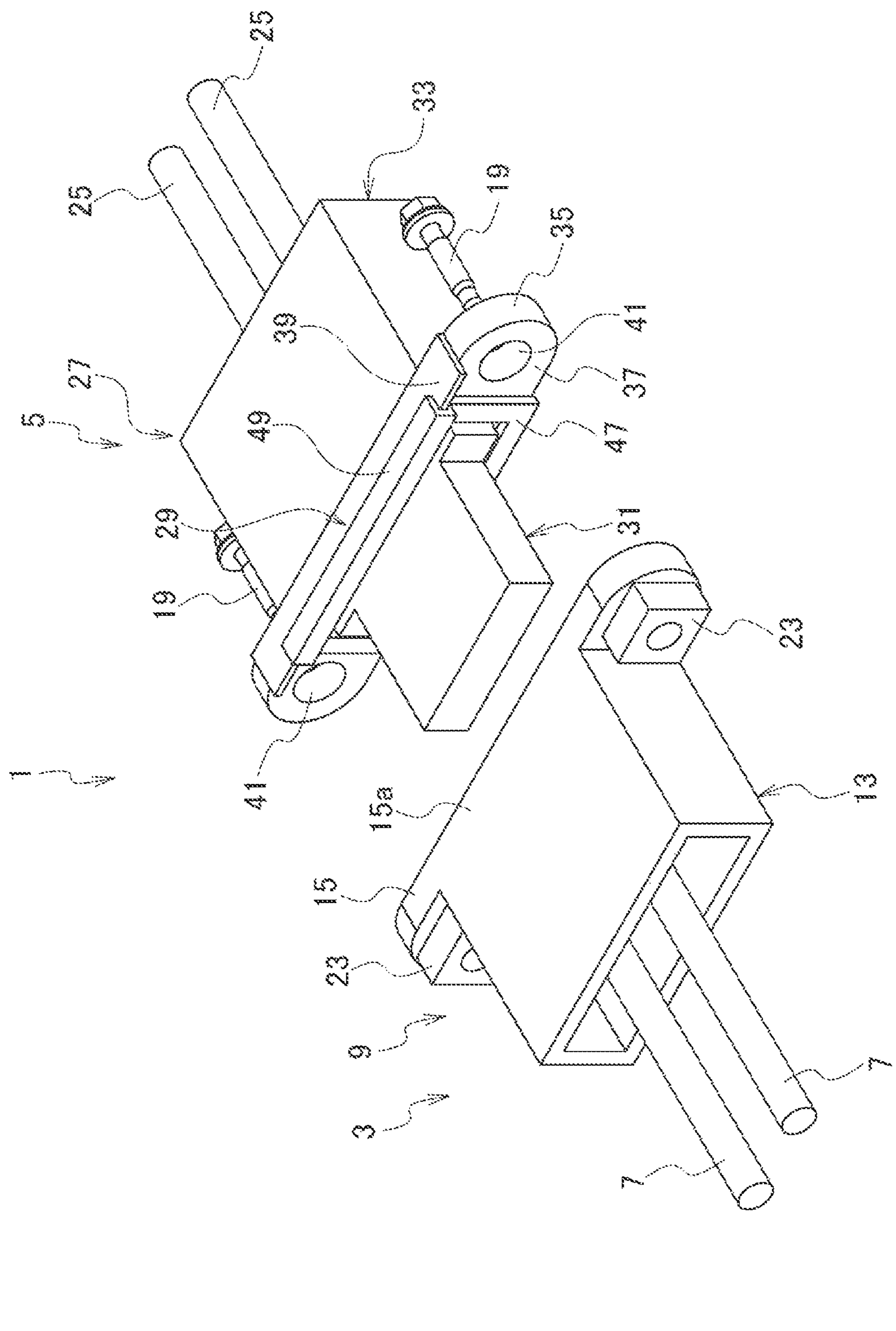
FIG. 1 is an exploded perspective view of a connector according to the present embodiment.
Figure 2:
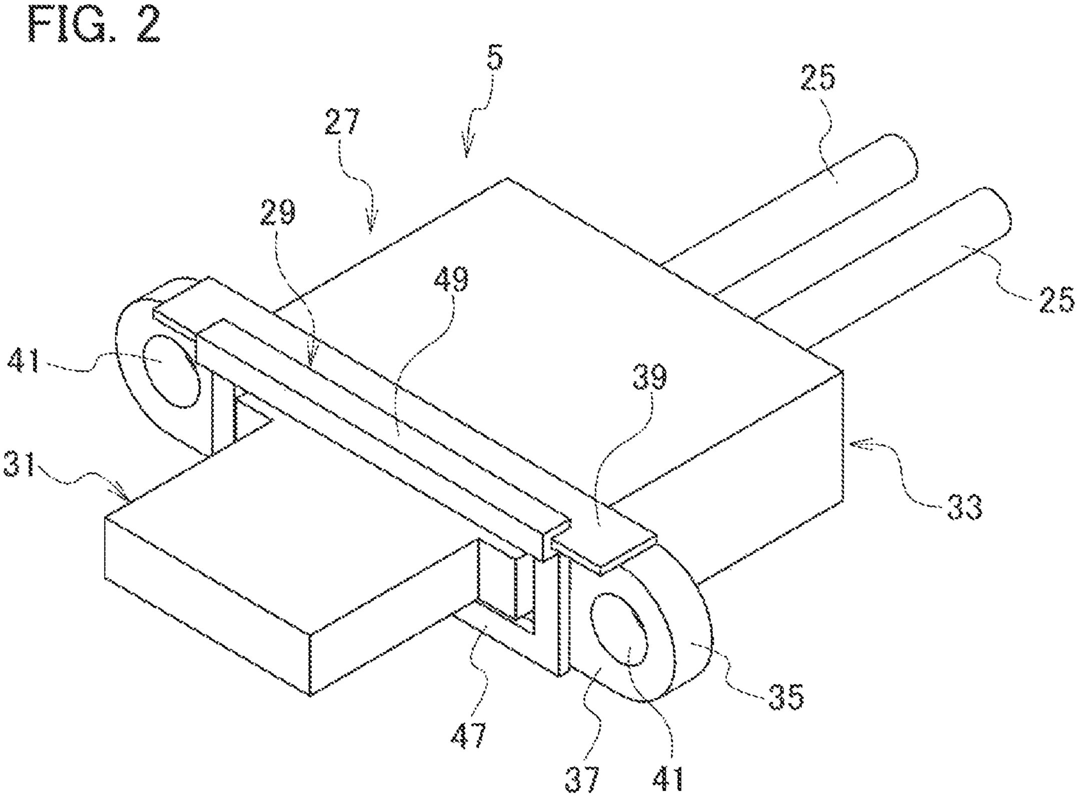
FIG. 2 is a perspective view of a wire harness according to the present embodiment.
Figure 3:
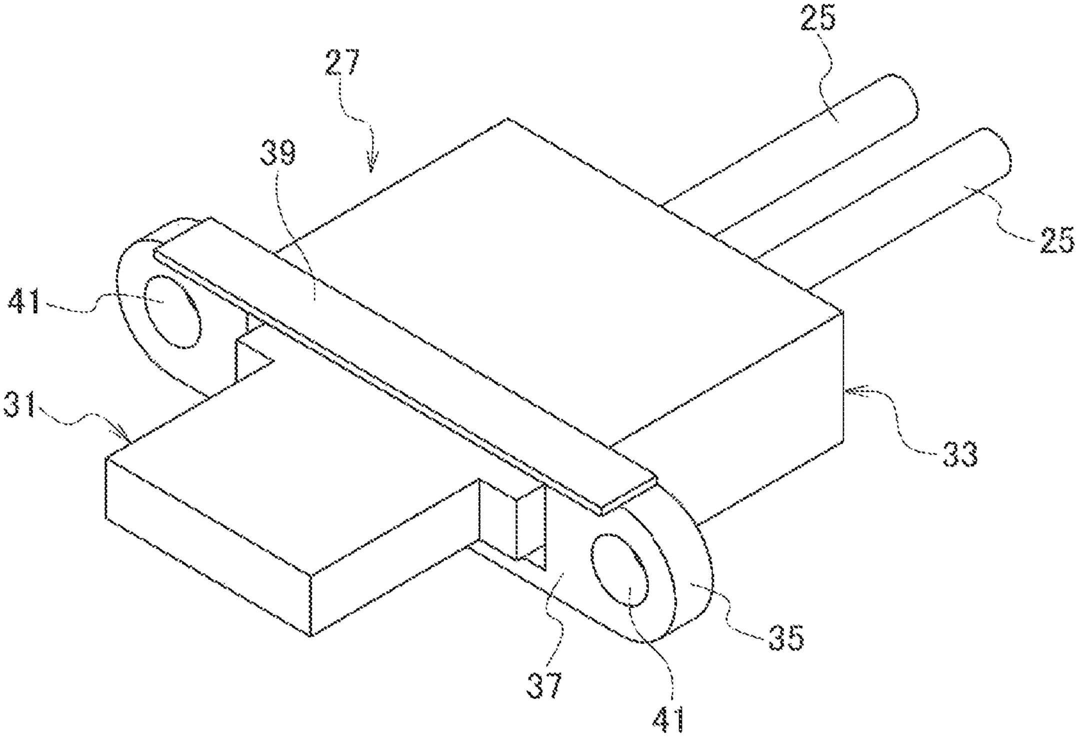
FIG. 3 is a perspective view of a housing for a connector according to the present embodiment.
Figure 4:
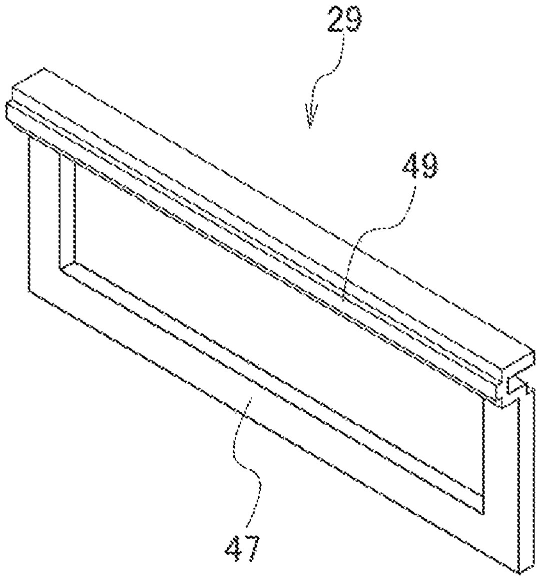
FIG. 4 is a perspective view of a sealing member according to the present embodiment.
Figure 5:
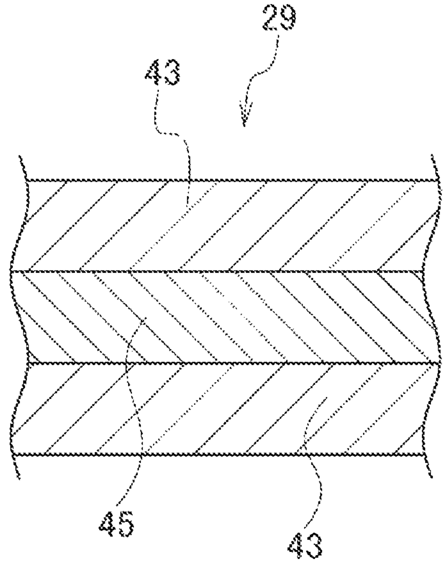
FIG. 5 is an enlarged cross-sectional view of the sealing member according to the present embodiment.

Referring to the drawings, a detailed description is given below of a sealing member, a wire harness, and a connector according to the present embodiment. Note that dimensional ratios in the drawings are exaggerated for convenience of the description and may differ from actual ratios.

As illustrated in FIG. 1, a connector 1 according to the present embodiment is applied to provide an electrical connection between electrical components (not illustrated), such as a power supply and an apparatus, or an apparatus and an apparatus. One electrical component has mating electric wires 7, 7 electrically connected thereto, and a mating housing 9 is electrically connected to the end parts of the mating electric wires 7, 7. The mating electric wires 7, 7 and the mating housing 9 make up a mating wire harness 3. The other electrical component has electric wires 25, 25 electrically connected thereto, and a housing 27 is electrically connected to the end parts of the electric wires 25, 25. The electric wires 25, 25 and the housing 27 make up a wire harness 5. In the connector 1, when the mating housing 9 and the housing 27 are fitted together, the mating wire harness 3 and the wire harness 5 are electrically connected, and the electrical components are electrically connected to each other.

As illustrated in FIGS. 1 to 6, the connector 1 includes the mating wire harness 3 and the wire harness 5.

Figure 6:
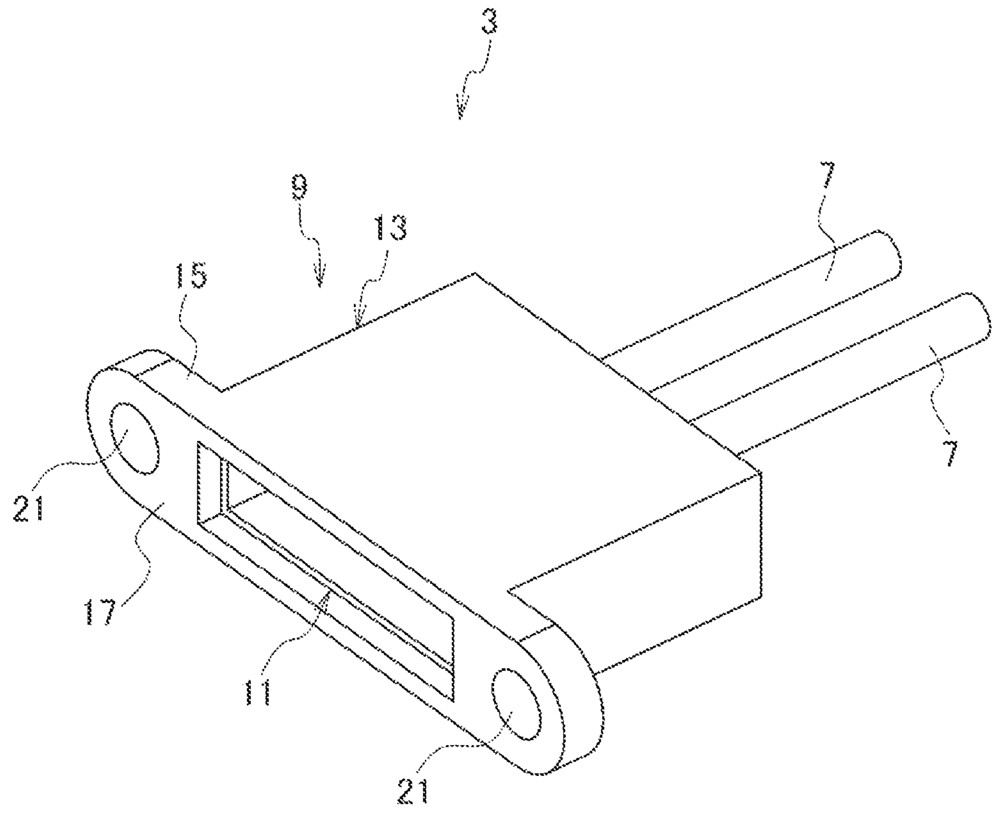
FIG. 6 is a perspective view of a mating wire harness of the connector according to the present embodiment.

As illustrated in FIGS. 1 and 6, the mating wire harness 3 includes the mating electric wires 7, 7 and the mating housing 9.

In the present embodiment, there are two mating electric wires 7. The ends of the mating electric wires 7, 7 on the left side in FIG. 1 are electrically connected to an electrical component. To the other ends of the mating electric wires 7, 7, mating terminals (not illustrated) are electrically connected. The mating terminals electrically connected to the mating electric wires 7, 7 are accommodated in the mating housing 9.

The mating housing 9 includes a mating inner housing 11 and a mating shield shell 13.

The mating inner housing 11 is made from, for example, an insulating material such as a synthetic resin. The mating inner housing 11 is formed in a case shape capable of accommodating multiple (two in the present embodiment) mating terminals. The inside of the mating inner housing 11 is provided with elastically deformable mating locking lances (not illustrated) to be respectively engaged with the mating terminals. When the mating locking lances are respectively engaged with the mating terminals, the mating terminals are retained relative to the mating inner housing 11, and the mating terminals are held in the mating inner housing 11.

The mating shield shell 13 is made from, for example, a conductive material such as metal. The mating shield shell 13 is formed in a case shape capable of accommodating the mating inner housing 11. The inside of the mating shield shell 13 is provided with a mating engagement part (not illustrated) to be engaged with the mating inner housing 11 to hold the mating inner housing 11 in the mating shield shell 13. A mating flange part is provided on the front side of the mating shield shell 13 in the direction of fitting with the housing 27. The surface of the mating flange part 15 on the front side in the fitting direction is a mating fitting surface 17. On both sides of the mating flange part 15 extending from the outer surface of the mating shield shell 13, mating fixing parts 21, 21 are provided having insertion holes which are formed through the mating flange part 15 and through which bolts 19, 19 can be inserted. On the mating fixing parts 21, 21 at the surface opposite to the mating fitting surface 17, nuts 23, 23 are arranged to which the bolts 19, 19 can be fastened. A grounded mating shield member (not illustrated) covering the outer periphery of the mating electric wires 7, 7 drawn from the mating housing 9, is electrically connected to the mating shield shell 13.

As illustrated in FIGS. 1 to 5, the wire harness 5 includes the electric wires 25, 25, the housing 27, and a sealing member 29.

In the present embodiment, there are two electric wires 25. The ends of the electric wires 25, 25 on the right in FIG. 1 are electrically connected to an electrical component. To the other ends of the electric wires 25, 25, terminals (not illustrated) are electrically connected. The terminals electrically connected to the electric wires 25, 25 are accommodated in the housing 27.

The housing 27 includes an inner housing 31 and a shield shell 33.

The inner housing 31 is made from, for example, an insulating material such as a synthetic resin. The inner housing 31 is formed in a case shape capable of accommodating multiple (two in the present embodiment) terminals and capable of being fitted inside the mating inner housing 11. The inside of the inner housing 31 is provided with elastically deformable locking lances (not illustrated) to be respectively engaged with the terminals. When the locking lances are respectively engaged with the terminals, the terminals are retained relative to the inner housing 31, and the terminals are held in the inner housing 31.

When the mating housing 9 and the housing 27 are fitted together, the inner housing 31 is fitted to the mating inner housing 11. When the mating inner housing 11 and the inner housing 31 are fitted together, the mating terminals and the terminals are electrically connected, and the electrical components are electrically connected.

The shield shell 33 is made from, for example, a conductive material such as metal. The shield shell 33 is formed in a case shape capable of accommodating the inner housing 31. The inside of the shield shell 33 is provided with an engagement part (not illustrated) to be engaged with the inner housing 31 to hold the inner housing 31 in the shield shell 33. Note that a part of the inner housing 31 accommodated in the shield shell 33 is exposed from the shield shell 33, and the exposed part can be fitted inside the mating inner housing 11. A flange part 35 is provided on the front side of the shield shell 33 in the direction of fitting with the mating housing 9. The surface of the flange part 35 on the front side in the fitting direction is a fitting surface 37. The flange part 35 is provided with a rib 39 protruding over the fitting surface 37. When the mating housing 9 and the housing 27 are fitted together, the rib 39 comes into contact with a part of a side surface 15*a* of the mating flange part 15 with the sealing member 29 described below therebetween, and positions the fitting position between the mating housing 9 and the housing 27. On both sides of the flange part 35 extending from the outer surface of the shield shell 33, fixing parts 41, 41 are provided having insertion holes which are formed through the flange part 35 and through which the bolts 19, 19 can be inserted. In a state where the bolts 19, 19 are fastened to the nuts 23, 23, the heads of the bolts 19, 19 are brought into contact, through washers, with the fixing parts 41, 41 at the surface opposite to the fitting surface 37. A grounded shield member (not illustrated) covering the outer periphery of the electric wires 25, 25 drawn from the housing 27 is electrically connected to the shield shell 33.

When the mating housing 9 and the housing 27 are fitted together, the shield shell 33 is fitted to the mating shield shell 13 in such a manner that the mating fitting surface 17 of the mating flange part 15 is in contact with the fitting surface 37 of the flange part 35. The fitting of the mating shield shell 13 and the shield shell 33 is held by inserting the bolts 19, 19 into the mating fixing parts 21, 21 (see FIG. 6) and the fixing parts 41, 41 and fastening the bolts 19, 19 to the nuts 23, 23. When the mating shield shell 13 and the shield shell 33 are fitted together, a shield circuit is formed to prevent the intrusion of noise from the outside and the leakage of noise to the outside. The sealing member 29 is arranged on the fitting surface 37 of the flange part 35 of the shield shell 33.

Here, the sealing member 29 is arranged so as to adhere closely to the mating fitting surface 17 of the mating flange part 15 and the fitting surface 37 of the flange part in a state where the mating housing 9 and the housing 27 are fitted together. When the sealing member 29 adheres closely to the mating fitting surface 17 and the fitting surface 37, sealing is realized between the mating housing 9 and the housing 27, and it is possible to prevent water, oil, or the like from entering the inside of the mating housing 9 and the inside of the housing 27.

A conventional sealing member is formed of a single sealing material, for example, an elastic material such as rubber. A sealing member formed of a single sealing material has high close adhesion to the mating fitting surface 17 and the fitting surface 37 and has excellent sealing properties, but has low rigidity and easily deforms. Consequently, when a conventional sealing member interferes with, for example, the rib 39, it deforms and lifts up from the mating fitting surface 17 and the fitting surface 37 at the part where it has interfered, and there has been a possibility of a gap forming between the mating fitting surface 17 and the fitting surface 37, resulting in reduced sealing properties.

Thus, the sealing member 29 includes sealing materials 43, 43 and a high rigidity material 45.

Each of the sealing materials 43 is made from, for example, an elastic material such as ethylene propylene diene rubber (EPDM). Each sealing material 43 is formed into a sponge shape and a sheet shape, for example. The sealing materials 43, 43 are arranged on top of each other. In the present embodiment, there are two sealing materials 43.

The high rigidity material 45 is made from, for example, a synthetic resin material having rigidity higher than that of each of the sealing materials 43 or a metal material having rigidity higher than that of each of the sealing materials 43. The high rigidity material 45 is formed in a plate shape equal to or thinner than each of the sealing materials 43, 43, for example. The high rigidity material 45 is arranged between the adjacent sealing materials 43, 43 and is fixed through adhesion or the like as a single body with the sealing materials 43, 43. The outer edge of the high rigidity material 45 is arranged so as to be surrounded by the adjacent sealing materials 43, 43. The adjacent sealing materials 43, 43 protruding from the outer edge of the high rigidity material 45 are adhered closely and fixed to each other through adhesion or the like. Consequently, the entire outer surface of the sealing member 29 is made from the sealing materials 43 without the high rigidity material 45 exposed.

The sealing member 29 made from the sealing materials 43, 43 and the high rigidity material 45 is arranged on the fitting surface 37 of the flange part 35 of the shield shell 33, and includes a planar part 47 and a bent part 49.

The planar part 47 is arranged between the mating fitting surface 17 and the fitting surface 37 in a state where the mating housing 9 and the housing 27 are fitted together. The planar part 47 is provided by fixing the sealing materials 43, 43 respectively to both surfaces in the thickness direction of the high rigidity material 45 shaped in a planar shape. In the planar part 47, the sealing materials 43, 43 arranged on both sides in the thickness direction closely adhere to the mating fitting surface 17 and the fitting surface 37, respectively.

The bent part 49 is formed to be continuous with the planar part 47. In a state where the mating housing 9 and the housing 27 are fitted together, the bent part 49 is arranged between a part of the side surface 15*a* of the mating flange part 15 and the outer surface of the rib 39. The bent part 49 is provided by fixing the sealing materials 43, 43 respectively to both surfaces in the thickness direction of the high rigidity material 45 shaped in accordance with the outer shape of the rib 39. In the bent part 49, the sealing materials 43, 43 arranged on both sides in the thickness direction closely adhere to a part of the side surface 15*a* of the mating flange part 15 and the outer surface of the rib 39, respectively. Note that in the case where the high rigidity material 45 is made from a material that plastically deforms, after forming the sealing member 29 in a planar shape, the high rigidity material 45 may plastically deform in accordance with the outer shape of the rib 39 to provide the bent part 49. Note that at the bent corner of the bent part 49, a slit is provided along the longitudinal direction of the rib 39 in the high rigidity material 45. By providing the slit in the high rigidity material 45, the corner of the bent part 49 is easily bent, and it becomes easier for the shape of the bent part 49 to follow the outer shape of the rib 39.

In the sealing member 29, for example, even when the sealing member 29 interferes with the rib 39, due to the high rigidity material 45, no deformation occurs. Consequently, no gap occurs between the sealing member 29 and each of the mating fitting surface 17 and the fitting surface 37, thereby stabilizing the sealing properties. In addition, as the sealing member 29 includes the planar part 47 and the bent part 49, the sealing member 29 is shaped to match the shape of the mating member to be adhered closely. The state in which the sealing member 29 is shaped is maintained by the high rigidity material 45 without deformation. Consequently, no gap occurs between the sealing member 29 and the mating member to be adhered closely, thereby stabilizing the sealing properties.

Note that although the sealing member 29 incudes the planar part 47 and the bent part 49, the planar part 47 may be provided alone without providing the bent part 49, for example. Even such a sealing member 29 can suppress the occurrence of the deformation of the planar part 47 and the occurrence of a gap between the planar part 47 and each of the mating fitting surface 17 and the fitting surface 37. In the sealing member 29, the high rigidity material 45 is arranged between the adjacent sealing materials 43, 43, but the arrangement is not limited thereto. For example, the high rigidity material 45 may be arranged only on one side of one sealing material 43. In this case, the sealing material 43 may be arranged to protrude from the outer edge of the high rigidity material 45 in order to cause the sealing material 43 to closely adhere to the mating member. In addition, the high rigidity material 45 is not limited to a plate shape and may be any shape. For, example, the high rigidity material 45 may be formed in a linear shape, and multiple linear high rigidity materials 45 may be arranged in rows or in a lattice shape.

The sealing member 29 includes at least one sealing material 43 made from an elastic material, and a high rigidity material 45 provided as a single body with the at least one sealing material 43 and having a rigidity higher than that of the at least one sealing material 43. By providing the high rigidity material 45, the deformation of the sealing material 43 can be suppressed. Consequently, the occurrence of a gap between the sealing material 43 and a mating member to which the sealing material 43 is adhered closely can be suppressed.

Therefore, such a sealing member 29 can stabilize the sealing properties.

In addition, the at least one sealing material 43 includes multiple sealing materials 43. The multiple sealing materials 43 are arranged on top of each other. The high rigidity material 45 is arranged between adjacent sealing materials 43, 43. Consequently, the exposed area of the sealing material 43 can be increased, and the sealing properties can be improved.

Furthermore, the wire harness 5 includes the electric wires 25, the housing 27 arranged at the end parts of the electric wires 25, and the sealing member 29 arranged at the fitting surface 37 of the housing 27. When the housing 27 is fitted to a mating member (mating housing 9 in the present embodiment), the sealing member 29 arranged at the fitting surface 37 of the housing 27 is adhered closely to the mating member. At this time, deformation of the sealing member 29 is suppressed by the high rigidity material 45. Consequently, the occurrence of a gap between the sealing member 29 and each of the fitting surface 37 and the mating member can be suppressed.

Therefore, the wire harness 5 provided with the sealing member 29 can stabilize the sealing properties.

The connector 1 includes the housing 27, the mating housing 9 which can be fitted to the housing 27, and the sealing member 29 arranged between the housing 27 and the mating housing 9 and adhered closely to the housing 27 and the mating housing 9. Deformation of the sealing member 29 adhered closely to the housing 27 and the mating housing 9 is suppressed by the high rigidity material 45. Consequently, the occurrence of a gap between the sealing member 29 and each of the housing 27 and the mating housing 9 can be suppressed.

Therefore, the connector 1 provided with the sealing member 29 can stabilize the sealing properties.

Although the present embodiment has been described above, the present embodiment is not limited to these descriptions, and various modifications are possible within the scope of the gist of the present embodiment.

For example, there are two sealing members according to the present embodiment, but the number thereof is not limited to this, and there may be three or more sealing members. In this case, a high rigidity material may be disposed between each of multiple sets of adjacent sealing materials. In addition, the outer edge of the high rigidity material may be covered with adjacent sealing materials to eliminate exposure of the high rigidity material, and the entire outer surface of the sealing member may be used as a sealing material. Furthermore, a high rigidity material may be embedded in one sealing material.

In addition, the sealing member according to the present embodiment includes a planar part and a bent part, but the configuration is not limited thereto, and the sealing member may be shaped according to the shape of a mating member to be arranged in close adhesion, for example, so as to only include the planar part or only include the bent part. The shaped sealing member can maintain its shape due to the high rigidity material.

Furthermore, the sealing member according to the present embodiment is arranged between a housing and a mating housing but is not limited to this arrangement, and the sealing member may be arranged between any members, for example, between a case member and a panel member.

In the wire harness according to the present embodiment, a housing is fitted to a mating housing, but the configuration is not limited thereto. For example, the fitting surface of the housing may be mounted on a wall surface of a case member or panel member. Even in such a case, a sealing member arranged on the fitting surface of the housing closely adheres to the wall surface of the case member or panel member and can seal a gap between the housing and the case member or panel member. In addition, in the present embodiment, there are two electric wires, but the number thereof is not limited to this, and there may be one, or three or more electric wires. Similarly, in the present embodiment, there are two mating electric wires, but the number is not limited to this, and there may be one, or three or more mating electric wires.

Furthermore, in the connector according to the present embodiment, the housing includes a shield shell and an inner housing, and the mating housing includes a mating shield shell and a mating inner housing, but the configuration is not limited thereto. For example, the housing and mating housing may be made as one member and may be made so that they can be fitted to each other, and a sealing member may be arranged between the housing and the mating housing. In addition, although the sealing member is arranged in the housing in the state before the housing and mating housing are fitted together, the arrangement is not limited thereto, and the sealing member may be arranged in the mating housing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A sealing member, comprising:

at least one sealing material made from an elastic material;

a high rigidity material provided as a single body with the at least one sealing material and having a rigidity higher than a rigidity of the at least one sealing material, a bent part; and a planar part formed to be continuous with the bent part, wherein an entire outer surface of the sealing member is made from the at least one sealing material such that the high rigidity material is not exposed, the planar part is configured to be arranged on a planar surface of a housing, and the bent part is configured to be arranged on an outer rib provided on the planar surface of the housing, and the bent part is bent so as to match a shape of the outer rib provided on the planar surface of the housing.

2. The sealing member according to claim 1, wherein the at least one sealing material includes a plurality of sealing materials, the plurality of sealing materials are arranged on top of each other, and the high rigidity material is arranged between adjacent sealing materials.

3. A wire harness, comprising:

an electric wire;

a housing arranged at an end part of the electric wire; and a sealing member arranged on a fitting surface of the housing, wherein the sealing member includes:

at least one sealing material made from an elastic material;

a high rigidity material provided as a single body with the at least one sealing material and having a rigidity higher than a rigidity of the at least one sealing material;

a bent part; and a planar part formed to be continuous with the bent part, an entire outer surface of the sealing member is made from the at least one sealing material such that the high rigidity material is not exposed, the planar part is arranged on a planar portion of the fitting surface, and the bent part is arranged on an outer rib provided on the fitting surface, and the bent part is bent so as to match a shape of the outer rib provided on the fitting surface.

4. A connector, comprising:

a housing;

a mating housing that can be fitted to the housing; and a sealing member arranged between the housing and the mating housing and adhered closely to the housing and the mating housing, wherein the sealing member includes:

at least one sealing material made from an elastic material;

a high rigidity material provided as a single body with the at least one sealing material and having a rigidity higher than a rigidity of the at least one sealing material;

a bent part; and a planar part formed to be continuous with the bent part, an entire outer surface of the sealing member is made from the at least one sealing material such that the high rigidity material is not exposed, the planar part is arranged on a planar portion of a fitting surface of the housing that is between the housing and the mating housing, and the bent part is arranged on an outer rib that is provided on the fitting surface of the housing, and the bent part is bent so as to match a shape of the outer rib provided on the fitting surface.

5. The sealing member according to claim 1, wherein, for each of the bent part and the planar part, the at least one sealing material is provided as a plurality of sealing materials, and the high rigidity material is arranged between adjacent sealing materials.

6. The wire harness according to claim 3, wherein the at least one sealing material is provided on the housing, and wherein the at least one sealing material is provided as a plurality of sealing materials, and the high rigidity material is arranged between adjacent sealing materials.

7. The connector according to claim 4, wherein the at least one sealing material is provided on the housing, and wherein the at least one sealing material is provided as a plurality of sealing materials, and the high rigidity material is arranged between adjacent sealing materials.

* * * * *